United States Patent [19]
Myers et al.

[11] 3,752,587
[45] Aug. 14, 1973

[54] APPARATUS FOR BORESIGHTING A LASER BEAM EMITTER DEVICE

[75] Inventors: James G. Myers, Fullerton; Francis J. Berg, Costa Mesa; Bernard R. Martus, Huntington Beach, all of Calif.

[73] Assignee: Philco-Ford Corporation, Philadelphia, Pa.

[22] Filed: Sept. 9, 1971

[21] Appl. No.: 178,857

[52] U.S. Cl.................. 356/153, 356/152, 356/154, 33/286
[51] Int. Cl. .......................................... G01b 11/26
[58] Field of Search.................... 356/152, 154, 138, 356/152; 33/286

[56] References Cited
UNITED STATES PATENTS

| | | | |
|---|---|---|---|
| 2,393,013 | 1/1946 | Barnes et al. | 356/154 |
| 3,528,747 | 9/1970 | Walsh | 356/154 |
| 3,574,467 | 4/1971 | Paine et al. | 356/153 X |
| 3,588,255 | 6/1971 | Alexander | 356/153 |
| 3,533,700 | 10/1970 | Alexander | 356/153 |
| 3,652,166 | 3/1972 | Bessko et al. | 356/153 |
| 3,582,215 | 6/1971 | Cornillault | 356/138 |
| 3,531,205 | 9/1970 | Nussmeier | 356/153 |
| 3,628,869 | 12/1971 | Clay et al. | 356/153 |

FOREIGN PATENTS OR APPLICATIONS

| | | | |
|---|---|---|---|
| 214,135 | 11/1966 | U.S.S.R. | 356/153 |

*Primary Examiner*—Ronald L. Wibert
*Assistant Examiner*—Paul K. Godwin
*Attorney*—Robert D. Sanborn

[57] ABSTRACT

A system for boresighting or aligning the optical axes of a combined infrared laser beam emitter and a low light level television telescope. An optical switch is located in the system where the axes of the telescope and the laser beam are combined, and is effective to divert at least a portion of the laser beam to a lens that focuses the beam on an opaque surface that is capable of being perforated by the laser energy. The opaque surface is backlit, so that after perforation by the laser a bright point of light can be seen in the telescope. If the axes of the laser beam and telescope are aligned, the bright spot will appear at the reticle center of the telescope. If not aligned, the axes are adjusted to produce alignment, or boresighting. The opaque surface is formed on a strip, and an automatic advancing device is operable to advance the strip to present a fresh opaque test surface, upon each boresighting operation.

12 Claims, 3 Drawing Figures

PATENTED AUG 14 1973

3,752,587

INVENTORS
JAMES G. MYERS
FRANCIS J. BERG
BY BERNARD R. MARTUS

Harry W. Hargis III

AGENT

APPARATUS FOR BORESIGHTING A LASER BEAM EMITTER DEVICE

BACKGROUND OF THE INVENTION

The invention herein disclosed was made in the course of or under a contract, or subcontract thereunder with the Department of the Air Force.

The field of this invention is lasers, and especially improvements in means for boresighting laser beam emitters operable to direct laser beams at distant targets.

In the boresighting of a relatively long-distance laser beam emitter with its optical viewing system, it has been found desirable to obviate the need for a protected, long-distance firing range.

It is an objective of the present invention to provide improved boresighting means of the aforesaid type, characterized by compactness of construction and ease of operation.

Specifically it is an objective to permit in-flight boresighting of an airborne laser system, thereby to achieve advantages afforded by boresighting immediately prior to aiming the laser system.

SUMMARY OF THE INVENTION

The present invention contemplates provision of an improved boresighting system for apparatus including a laser adapted to direct an invisible laser beam onto a target substantially distantly spaced from said laser, and a sighting means through which the target may be observed and the apparatus aimed thereat during the lasing operation. The improved boresighting system comprises optical switching means located in the region of combined axes of the laser beam and the sighting means, and operable to divert the laser beam through a telescopic objective effective to focus the beam onto means defining an opaque surface. Means is provided for illuminating the point of impingement of the beam on the opaque surface, with which point the sighting means may be aligned. The opaque surface is formed on a strip of suitable material, and means is provided for automatically advancing the strip, upon each boresighting operation, to present a new opaque surface for the next following boresighting operation.

The foregoing as well as other objectives and features of the invention will be more fully understood from the following description, taken with the accompanying drawing.

DESCRIPTION OF THE PREFERRED EMBODIMENT

Figure 1:
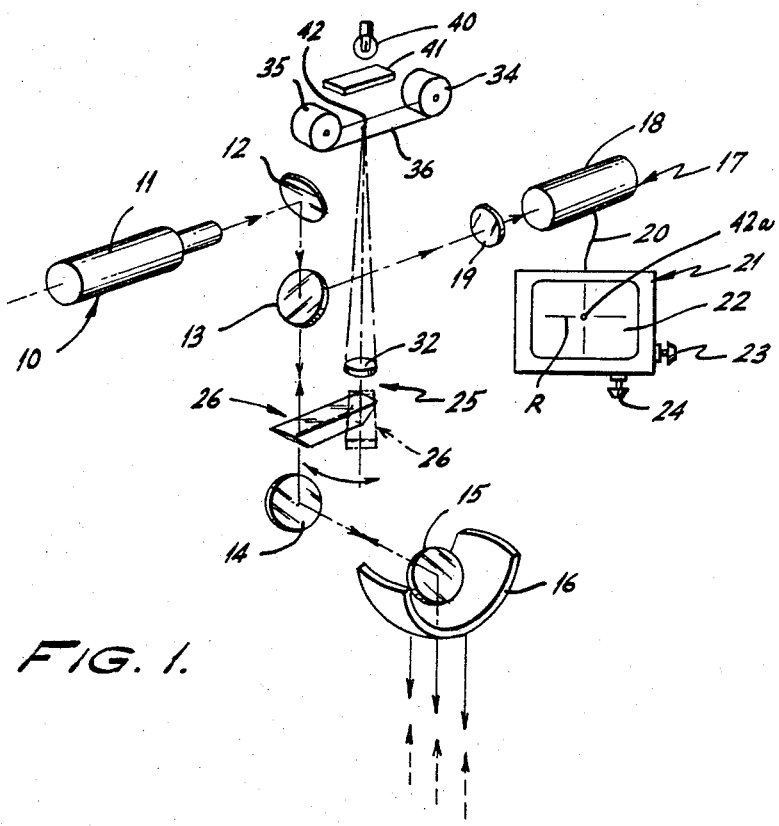
FIG. 1 is a diagrammatic showing of a laser beam emitter including an aiming device, and improved means for boresighting the same featured by an optical switching device for directing the laser beam onto an automatically renewable opaque screen.
Figure 2:
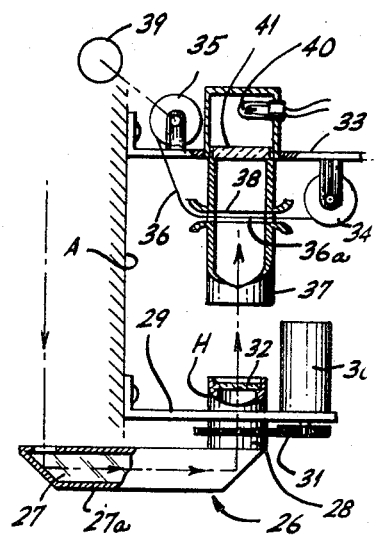
FIG. 2 is a somewhat more detailed showing of the improved means for boresighting seen in FIG. 1.

With more detailed reference to FIGS. 1 and 2 of the drawing, a laser apparatus 10 embodying the invention is supported by suitable framing structure, a portion of which is shown somewhat diagrammatically at A in FIG. 2, and which structure may be carried in an aircraft or other suitable vehicle. It is a feature of the invention that each element of FIG. 1 is in the aircraft, with the exception of an optical dome 16 which serves as the aircraft-atmosphere interface.

Apparatus 10 includes a laser beam emitter 11 arranged to direct a beam of coherent light outwardly of the supporting structure, toward a selected distant target. The beam, in passing toward the target, undergoes successive reflections by: an adjustably fixed mirror 12, affording direct passage through a beam splitter 13; a fixed mirror 14; and a gyroscopically stabilized, controlled mirror 15 of known construction, whence the beam passes through optical dome 16 and toward the target, as represented by the solid arrows. Light from the target (broken-line arrows) traverses the system in the reverse direction, and a portion thereof is diverted by the beam splitter 13 which is dichroic, being made to pass almost 100 percent of the invisible laser output and to reflect visible light from the target at almost 100 percent.

In order to achieve the transmission of both visible light and infrared energy, elements 13, 16, 27, and 32 conveniently are made of a material such as quartz, sapphire, or any of certain types of glass as are well known in the art. Elements 12, 14 and 15, and the reflective face of beam splitter 13 need only be reflective of radiant energy, generally, and there are a number of well known materials that will perform adequately for this purpose.

Also included is a TV camera 17 of conventional design including a vidicon 18 and objective lens 19 arranged along an optical axis aligned with beam splitter mirror 13, and positioned at an angle to the axis of the laser beam passing through the beam splitter mirror. Vidicon 18 is connected, in known manner through suitable conduit means 20, to a television device 21 including a viewing screen 22. The screen is provided with a cross-hair type reticle R capable of being aligned with the axis of the laser beam by means of adjustable horizontal and vertical potentiometers 23, 24, respectively. As is known in this art, the target can be viewed at screen 22, providing a line-of-sight indication of where the invisible laser will impinge when activated.

The present invention is directed to improved means for establishing coincidence between the axis of the laser beam and the line of sight, as represented by the reticle R.

In establishment of such coincidence, boresighting means 25 is provided which includes an optical switch 26 located in the system where the optical axes of the sighting means and the laser beam coincide. As is seen to advantage in FIG. 2, optical switch 26 includes a porro-prism 27 supported on a tubular structure 28 mounted for rotation on a bracket 29 affixed to framing structure A. As shown, the prism is coated with a suitably apertured opaque material 27a to accommodate passage of light into and through the prism. A motor 30 is supported on bracket 29, and is coupled by gearing 31 to tubular structure 28 to rotate the prism through a predetermined fixed arc. The rotational arc of prism 27 is such that it places the outer end of the prism either in the path of the laser beam (full line showing, FIGS. 1 and 2) or out of its path (broken line showing, FIG. 1). A focusing lens 32, also referred to herein as a telescopic objective, is optically aligned with the inner end of porro-prism 27, and is carried in a suitable tubular housing H on bracket 29, as shown.

The boresighting means is further featured by inclusion of means for advancing a strip bearing an opaque surface across a position to be impinged by light passing through the porro prism. This means includes a bracket 33, on framing structure A, that carries a strip supply reel 34 and a strip takeup reel 35. A solenoid 39 is associated with the takeup reel to provide for incremental movement of the strip 36 whereby to present a fresh frame portion 36a thereof upon each boresighting operation. The frame portion 36a is disposed in the focal plane of lens 32, and is held in such position by strip guide elements 38 defining a strip receiving slot in a tubular housing 37. A backlighting lamp 40 for frame portion 36a is disposed in a closed end region of housing 37, and a light diffuser/filter 41 is disposed between the lamp and the strip.

In operation of the boresighting system, gears 31 are rotated by motor 30 to position the free end of the porro prism 27 in the optical path taken by the outgoing laser beam. Apparatus 10 is then energized to fire laser emitter 11, and the laser beam is reflected by mirror 12, passes freely through beam splitter 13, and at least a portion of the beam is intercepted and reflected by porro prism 27 through focusing lens or telescopic objective 32. The laser beam passing through lens 32 is focused onto the frame portion of strip 36a in housing 37. The focused laser beam burns a hole 42 in the opaque surface of the strip, while lamp 40 is protected from the beam by diffuser/filter 41. Conveniently, strip 36 may comprise carbon paper, in which case the layer of carbon serves as the opaque surface. Strip 36 may also comprise photographic film that has been exposed to light and developed to leave thereon a layer of emulsion to serve as the opaque surface. Lamp 40 is energized to illuminate hole 42 in the strip frame portion 36a, the light traversing the hole passing through lens 32, for reflection by porro prism 27 onto beam splitter 13, for reflection thereby to pass through objective lens 19 and into vidicon 18.

The image of the hole 42 shows as a spot 42a on screen 22. The spot may show at a random location on the screen, and can be brought into the illustrated alignment with reticle R by adjusting the horizontal and vertical potentiometers 23 and 24, respectively. It will be understood that provision may be made for adjusting beam splitter 13, or mirror 12, to afford a coarse adjustment prior to the relatively fine adjustments afforded by potentiometers 23 and 24. Following alignment, lamp 40 is de-energized, and motor 30 is energized to rotate arm 28 and move the free end of porro prism 27 out of its laser beam intercepting position. This completes the boresighting operation, and the apparatus is ready for aiming and firing with a degree of accuracy which was heretofore difficult to achieve. It will be appreciated that boresighting with this equipment can be accomplished in rapid and accurate fashion, even under adverse conditions such as are frequently encountered in aircraft.

DESCRIPTION OF THE MODIFIED EMBODIMENT

Figure 3:
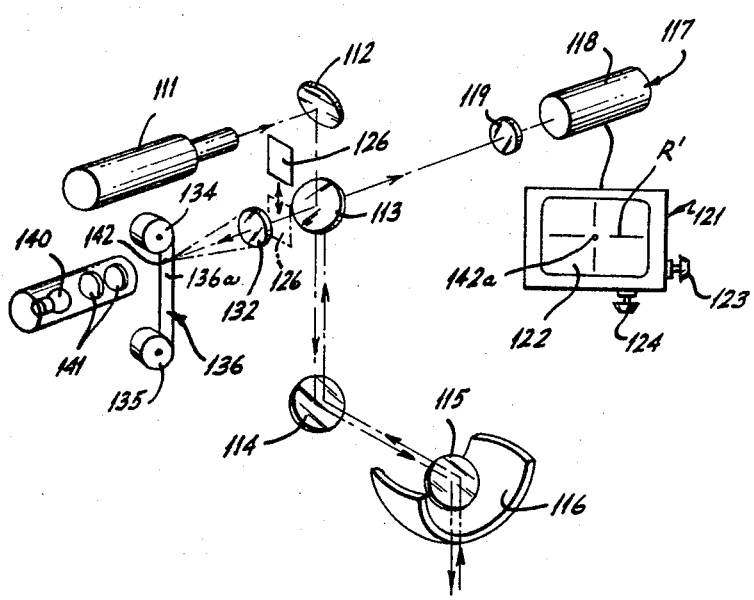
FIG. 3 is a showing similar to FIG. 1, and illustrating a modification of the boresighting means.

Referring now to FIG. 3, a modified embodiment of the invention also includes a laser beam emitter 111 arranged to direct a beam of coherent light toward a selected distant target, upon successive reflections by: a fixed mirror 112 for passage through a beam splitter 113; a fixed mirror 114, and a stabilized and controlled mirror 115, for passage through an optical dome 116.

A TV camera 117 includes vidicon 118 and objective lens 119 arranged along an optical axis aligned with beam splitter 113 and extending at an angle to the axis of the laser beam passing through the beam splitter. As is the case with the preferred embodiment, vidicon 118 is connected to a television device 121 including a viewing screen 122 provided with a reticle R'. Alignment of the reticle with the outgoing laser beam is provided for by adjustable horizontal and vertical potentiometers 123 and 124.

In provision for boresighting, film or strip supply and take-up reels 134 and 135 accommodate positioning of a frame portion of film 136 in the focal plane of a focusing lens 132 disposed and effective to transmit a portion of the laser beam reflected by beam-splitter mirror 113. A two-position shutter 126 is movable to a location indicated by full lines to permit passage of the reflected beam through lens or telescopic objective 132 for focusing on the aforementioned frame portion of film 136. Impingement of the focused beam burns a hole 142 in the film, which hole is backlit by lamp 140 positioned so that its rays pass through diffuser and filter elements 141. Hole 142 is observable as image 142a on screen 122 and, for the sake of convenience, image 142a is shown aligned with reticle R'. However, should the image 142a be out of alignment with reticle R', it may be readily brought into alignment by adjusting potentiometers 123 and 124. Upon completion of alignment, lamp 140 is de-energized, and shutter 126 is moved into the position indicated by broken lines where it is effective to block the reflected laser beam. The apparatus is then ready for aiming and firing.

It will be appreciated that an advantage of the embodiment shown in FIG. 3 is that boresighting is achieved with a minimum of relative movements between the optically reflective and transmissive elements.

As either an alternative, or an adjunct to either of the hereinabove described means for establishing coincidence of the laser beam axis with the reticle, provision may be made for achieving three-dimensional adjustment of beam splitters 13 and 113 or mirrors 12 and 112 while remaining elements are held in fixed position.

As will be understood, it has been heretofore a practice in the art to boresight prior to startup and takeoff of an aircraft equipped with laser firing and aiming apparatus. It will be appreciated that either of the illustrated embodiments featured by built-in optical means afford in-flight boresighting featured by capability of making adjustments as may be required just prior to firing of the apparatus in its use. Thus improved accuracy is ensured since the boresighted apparatus is subjected to a minimum of vibrations tending to disrupt axial alignment of the optical elements prior to its intended use.

We claim:

1. Apparatus including a laser for directing a laser beam onto a target substantially distantly spaced from said laser, and sighting means in predetermined association with said laser through which the target may be observed during the lasing operation, means for testing the alignment of said laser beam with respect to said sighting means, comprising: telescopic objective means positioned to transmit the laser beam during testing and to focus such beam in a plane relatively closely spaced from said laser as compared with the distant spacing of a target; screen means positioned in the focal plane of said telescopic objective means in order that there may be formed thereon a visible image indicative of the point of impingement of the focused beam, light from said image being transmitted through said telescopic objective means and observable through the sighting means included in the mentioned apparatus; beam splitter means constructed and positioned to transmit a substantial portion of said laser beam and to reflect a substantial portion of visible light in provision either for sighting of a target through said sighting means or for observation through said sighting means of the said image of the mentioned point of impingement of the focused beam; means for removing said telescopic objective means from the optical path of said laser after 42 completion of a test so as to accommodate sighting onto a distant target; means for automatically presenting a fresh screen means in its recited position upon completion of a test; and means providing for adjustment of the elements of said apparatus to bring said sighting means into effective coincidence with said image of the point of impingement of the focused beam on said screen means, as observed through said sighting means during testing of said equipment.

2. Apparatus according to claim 1, and characterized in that said means for removing said telescopic objective means comprises a light shutter mounted for movements into and out of the path of light between said beam splitter and said telescopic objective means.

3. Apparatus according to claim 1 and characterized in that said means for removing said telescopic objective means comprises a porro prism selectively positionable in the path of light from said laser and transmitted by said beam splitter and effective to reflect at least a portion of the laser beam through said telescopic objective means for impingement on said screen means.

4. Apparatus according to claim 1 and characterized in that said means for automatically presenting a fresh screen means comprises a strip for conveying a plurality of such screen means, a supply reel and a takeup reel for said strip, and means for advancing said strip from said supply reel onto said takeup reel an increment at a time in provision of each of said plurality of screen means.

5. Apparatus according to claim 4, and further characterized in that said strip and said screen means comprise carbon paper, and in that each said screen means is defined by a frame of such strip.

6. Apparatus including a laser for directing a laser beam onto a target, and sighting means for said laser, comprising a beam splitter and means through which the target may be observed and the apparatus aimed thereat during the lasing operation, means for boresighting said apparatus to test alignment of said laser beam with respect to said means for observing, said boresighting means comprising: screen means; telescopic objective means positionable to transmit the laser beam during test and to focus such beam onto said screen means, in order that there may be formed thereon a visible image indicative of the point of impingement of the focused beam, light from said image being transmitted through said telescopic objective means and observable through said observing means; said beam splitter being effective to transmit a substantial portion of said laser beam, and to reflect a substantial portion of visible light in provision either for sighting of a target through said sighting means or for observation through said sighting means of said image of the mentioned point of impingement of the focused beam; means for removing said telescopic objective means from the optical path of said laser upon completion of a boresighting operation to accommodate sighting onto a target; means for automatically presenting a fresh screen means in its recited position upon completion of a boresighting operation; and means providing for adjustment of the elements of said apparatus to bring said sighting means into effective coincidence with said image of the point of impingement of the focused beam on said screen means, as observed through said sighting means during boresighting of said equipment.

7. Apparatus according to claim 6, and characterized in that said means for removing said telescopic objective means comprises a porro prism positionable in the path of light from said laser and transmitted by said beam splitter and effective in such position to reflect at least a portion of the laser beam through said telescopic objective means for impingement on said screen means.

8. Apparatus according to claim 6, and characterized in that said means for removing said telescopic objective means comprises a light shutter mounted for movements into and out of the path of the laser beam extending between said beam splitter and said screen means.

9. Apparatus according to claim 6, and characterized in that said means for automatically presenting a fresh screen means comprises a strip of laser energy sensitive material, a pair of rotational reels for supplying and taking up portions of said strip positioned to serve as said screen means, and means for rotating said reels to advance said portions incrementally.

10. For use in apparatus of the type including a laser directing a laser beam toward a distant target and means for optically aiming said laser beam at said target, boresighting means comprising: telescopic objective means positionable in the optical path of said laser to focus said beam in a plane more closely spaced from said laser than said target is spaced; means for positioning said telescopic objective means in the optical path of said laser and for automatically presenting a screen means in the focal plane of said telescopic objective means whereby to provide an image of the point of impingement; and means for establishing effective coincidence between such means for optically aiming and the image of the focused laser beam on said screen means, as observable through said aiming means, in achievement of such boresighting operation.

11. Boresighting means according to claim 10, and characterized by the inclusion of a porro prism selectively positionable in the path of the laser beam emitted by said laser device, and effective in such position to reflect at least a portion of said beam through said telescopic objective means.

12. Boresighting means according to claim 10, and characterized in that said means presenting a screen means comprises a strip having a plurality of such screen means, a supply reel and a takeup reel for said strip, and including means for advancing said strip from said supply reel onto said takeup reel thereby to provide for sequential presentation of such screen means

* * * * *